United States Patent
Thakore et al.

(10) Patent No.: US 11,210,149 B2
(45) Date of Patent: Dec. 28, 2021

(54) PRIORITIZATION OF DATA COLLECTION AND ANALYSIS FOR INCIDENT DETECTION

(71) Applicant: international Business Machines Corporation, Armonk, NY (US)

(72) Inventors: Uttam Thakore, Urbana, IL (US); HariGovind Venkatraj Ramasamy, Round Rock, TX (US); Yu Gu, Austin, TX (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 16/193,144

(22) Filed: Nov. 16, 2018

(65) Prior Publication Data

US 2020/0159600 A1    May 21, 2020

(51) Int. Cl.
| | | |
|---|---|---|
| *G06F 11/00* | (2006.01) | |
| *G06F 16/25* | (2019.01) | |
| *G06F 16/901* | (2019.01) | |

(52) U.S. Cl.
CPC .......... *G06F 11/004* (2013.01); *G06F 16/258* (2019.01); *G06F 16/9024* (2019.01); *G06F 2201/86* (2013.01)

(58) Field of Classification Search
CPC .... G06F 11/004; G06F 11/3476; G06F 17/40; G06F 16/258; G06F 16/9024; G06F 16/285; G06F 16/338; G06F 2201/86
See application file for complete search history.

(56) References Cited

U.S. PATENT DOCUMENTS

| | | | |
|---|---|---|---|
| 5,613,113 A * | 3/1997 | Goldring | .............. G06Q 40/025 |
| 8,594,977 B2 | 11/2013 | Laberge et al. | |
| 8,943,364 B2 | 1/2015 | Bourne et al. | |
| 2005/0278052 A1 | 12/2005 | Bett et al. | |
| 2007/0032986 A1* | 2/2007 | Hines | .................. H04L 41/0631 |
| | | | 702/183 |
| 2007/0195700 A1* | 8/2007 | Katoh | ................. H04L 41/5054 |
| | | | 370/235 |
| 2007/0225956 A1* | 9/2007 | Pratt | ........................ G16B 5/00 |
| | | | 703/11 |

(Continued)

OTHER PUBLICATIONS

IBM, "System and Method for Statement of Incident," IP.Com, Apr. 7, 2009, IP.Com No. IPCOM000181624D, pp. 1-2.

(Continued)

*Primary Examiner* — Matthew M Kim
*Assistant Examiner* — Matthew N Putaraksa
(74) *Attorney, Agent, or Firm* — Robert R. Aragona

(57) ABSTRACT

A method, computer program product, and computer system for prioritization of data collection and analysis for incident detection. Data points within a plurality of monitor data corresponding to effects of incidents may be identified by a computing device. The plurality of monitor data may be converted to a set of time series extracted from the plurality of monitor data. The set of time series may be aligned and summarized. A causal relationship graph may be constructed between the set of time series extracted from the plurality of monitor data. Features may be prioritized by likelihood of importance in incident analysis based upon, at least in part, the causal relationship graph.

17 Claims, 9 Drawing Sheets

(56) References Cited

U.S. PATENT DOCUMENTS

| | | | |
|---|---|---|---|
| 2009/0182698 A1 | 7/2009 | Bethke et al. | |
| 2010/0268835 A1* | 10/2010 | Hartung | H04N 21/242 709/231 |
| 2012/0023262 A1* | 1/2012 | Berke | G06F 1/324 709/248 |
| 2013/0290336 A1* | 10/2013 | Moriguchi | G06T 7/215 707/737 |
| 2016/0165558 A1* | 6/2016 | Kafle | H04L 67/104 370/350 |
| 2017/0004511 A1* | 1/2017 | Saini | G06Q 30/0201 |
| 2017/0359361 A1* | 12/2017 | Modani | G06F 16/285 |
| 2018/0288097 A1* | 10/2018 | Poornachandran | G06F 21/55 |
| 2018/0348728 A1* | 12/2018 | Ota | G05B 19/058 |
| 2019/0102370 A1* | 4/2019 | Nelson | G06Q 10/103 |
| 2019/0220298 A1* | 7/2019 | Jiao | G06F 9/45558 |
| 2019/0258677 A1* | 8/2019 | Beedgen | G06F 7/00 |
| 2020/0134459 A1* | 4/2020 | Zeng | G05D 1/0246 |

OTHER PUBLICATIONS

Author Unknown, "Method and Model to Use Risk Analysis and Impact Analysis Data to Estimate Risk Return on Investment for Investments to Avoid, Mitigate, and Manage IT Risks," IP.Com, Oct. 14, 2011, IP.Com No. IPCOM000211753D, pp. 1-4.

Author Unknown, "The Application of Temporal Causal Modeling to Operational Risk Management Business Process," IP.Com, Feb. 23, 2012, IP.Com No. IPCOM000215281D, pp. 1-2.

Anjum et al., "On Optimal Placement of Intrusion Detection Modules in Sensor Networks," Broadband Networks 2004, BroadNets 2004, Proceedings, First International Conference on IEEE 2004, p. 1; Abstract Only.

Noel et al., "Optimal IDS Sensor Placement and Alert Prioritization using Attack Graphs," Journal of Network and Systems Management, 16.3 Sep. 2008, pp. 1-15.

Alsubhi et al., "Alert Prioritization in Intrusion Detection Systems," NOMS 2008-2008 IEEE Network Operations and Management Symposium, IEEE, pp. 33-40.

Qin et al., , "Statistical Causality Analysis of INFOSEC Alert Data," International workshop on Recent Advances in Intrusion Detection, Jan. 2003, https://www.researchgate.net/publication/288282389_Statistical_causality_analysis_of_IN . . . pp. 1-6.

Cabrera et al., "Proactive Intrusion Detection and SNMP-Based Security Management: New Experiments and Validation," Journal of Network ans Systems Management 10.2 (2002); pp. 1-4.

Arnold et al., "Temporal Causal Modeling with Graphical Granger Methods." KDD'07, Aug. 12-15, 2007, San Jose, CA, ACM, 978-1-59593-609-7/07/0008, pp. 66-75.

* cited by examiner

Use statistical causal analysis

Example: Granger causality analysis:
- Formally: $X \to_G Y$ iff $P[Y(t_{n+1}) \mid \mathcal{I}_{X,Y}(T)] > P[Y(t_{n+1}) \mid \mathcal{I}_Y(T)]$
- $\mathcal{I}_Y$ is information gained from just previous values of Y
- $\mathcal{I}_{X,Y}$ is information gained from previous values of X and Y Could be implemented using PC-algorithm

PRIORITIZATION OF DATA COLLECTION AND ANALYSIS FOR INCIDENT DETECTION

BACKGROUND

An "incident" may be generally described as an undesirable event that takes place in a distributed computing system that may result in a loss (but does not necessarily need to do so) and may be investigated to prevent such events from taking place again in the future. Incidents are often the source of problems with distributed system reliability, performance, safety, security, and availability. Generally, incident analysis may be the process by which investigators within an organization identify the underlying causes of incidents that have occurred in the distributed computing system, which are often called "root causes."

BRIEF SUMMARY OF DISCLOSURE

In one example implementation, a method, performed by one or more computing devices, may include but is not limited to identifying, by a computing device, data points within a plurality of monitor data corresponding to effects of incidents. The plurality of monitor data may be converted to a set of time series extracted from the plurality of monitor data. The set of time series may be aligned and summarized. A causal relationship graph may be constructed between the set of time series extracted from the plurality of monitor data. Features may be prioritized by likelihood of importance in incident analysis based upon, at least in part, the causal relationship graph.

One or more of the following example features may be included. The number of features to be analyzed by causal analysis may be reduced. Prioritizing features may include generating a prioritization score. Constructing the causal relationship graph may include pruning the causal relationship graph to remove one or more edges. The set of time series may be windowed to examine with causal analysis only the monitor data within a time range. Suggestions for features to be investigated when performing incident analysis may be provided. Suggestions for features to be monitored may be provided.

In another example implementation, a computing system may include one or more processors and one or more memories configured to perform operations that may include but are not limited to identifying data points within a plurality of monitor data corresponding to effects of incidents. The plurality of monitor data may be converted to a set of time series extracted from the plurality of monitor data. The set of time series may be aligned and summarized. A causal relationship graph may be constructed between set of time series extracted from the plurality of monitor data. Features may be prioritized by likelihood of importance in incident analysis based upon, at least in part, the causal relationship graph.

One or more of the following example features may be included. The number of features to be analyzed by causal analysis may be reduced. Prioritizing features may include generating a prioritization score. Constructing the causal relationship graph may include pruning the causal relationship graph to remove one or more edges. The set of time series may be windowed to examine with causal analysis only the monitor data within a time range. Suggestions for features to be investigated when performing incident analysis may be provided. Suggestions for features to be monitored may be provided.

In another example implementation, a computer program product may reside on a computer readable storage medium having a plurality of instructions stored thereon which, when executed across one or more processors, may cause at least a portion of the one or more processors to perform operations that may include but are not limited to identifying data points within a plurality of monitor data corresponding to effects of incidents. The plurality of monitor data may be converted to a set of time series extracted from the plurality of monitor data. The set of time series may be aligned and summarized. A causal relationship graph may be constructed between the set of time series extracted from the plurality of monitor data. Features may be prioritized by likelihood of importance in incident analysis based upon, at least in part, the causal relationship graph.

One or more of the following example features may be included. The number of features to be analyzed by causal analysis may be reduced. Prioritizing features may include generating a prioritization score. Constructing the causal relationship graph may include pruning the causal relationship graph to remove one or more edges. The set of time series may be windowed to examine with causal analysis only the monitor data within a time range. Suggestions for features to be investigated when performing incident analysis may be provided. Suggestions for features to be monitored may be provided.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DETAILED DESCRIPTION

Figure 1:
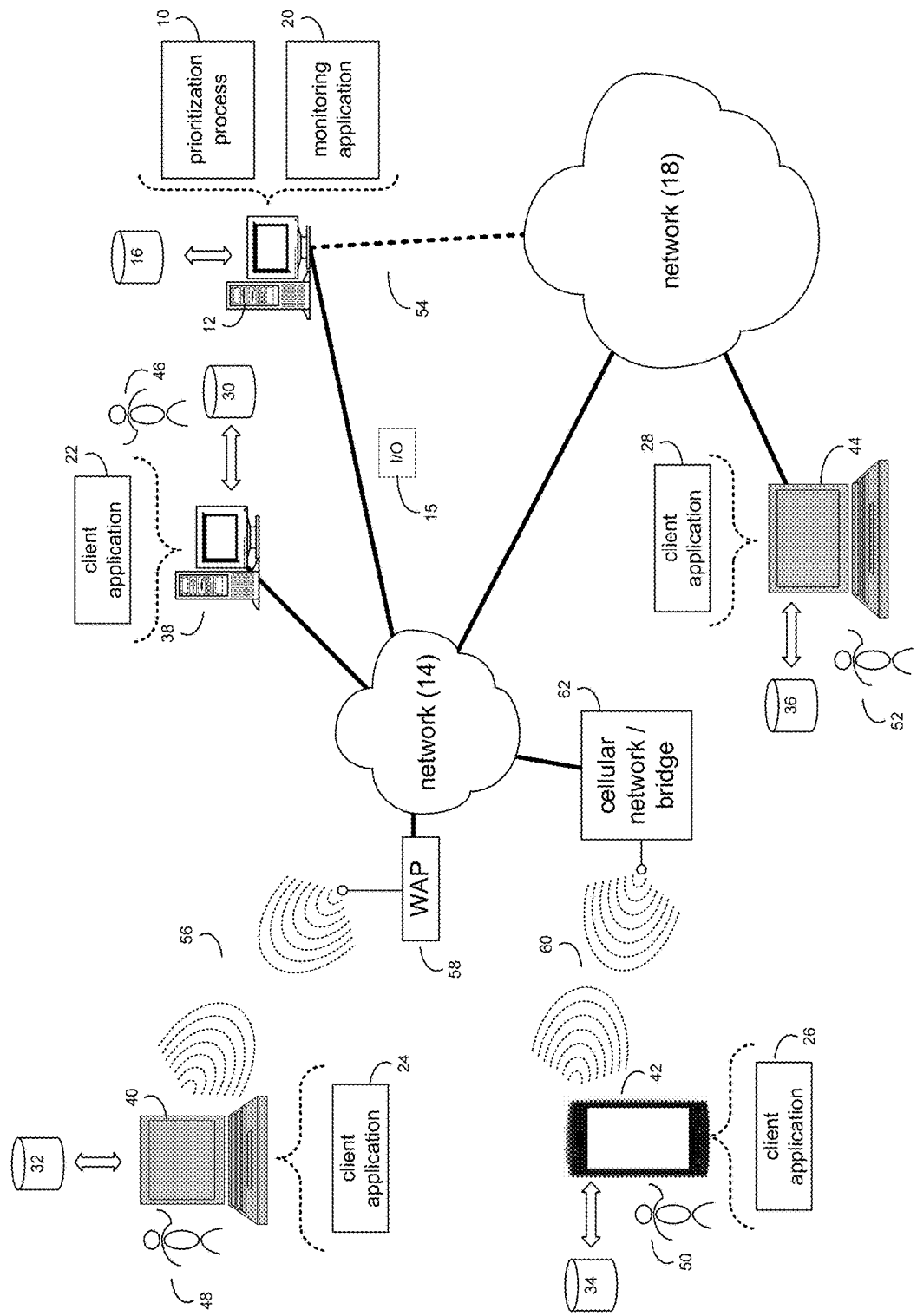
FIG. 1 is an example diagrammatic view of a prioritization process coupled to an example distributed computing network according to one or more example implementations of the disclosure.

System Overview:

As noted above, in distributed computer (e.g., IT) systems, system data may be collected for analysis and detection of undesirable events. In IT systems, analysis is typically done through generation of tickets at a helpdesk and manual analysis of the tickets and metric and log information to identify the root cause of the event. Incident response teams (IRTs) typically must manually inspect the data in the collected metric and log files to identify unexpected behavior, then relate the behavior to that evidenced by other metric and log information to reconstruct a picture of the behavior of systems when the undesirable event occurred. If the event occurred over a large timescale, this effort may be complicated by the high volume of benign data points that do not correspond to the behavior related to the undesirable event.

When determining which data to collect and where to begin analysis, system administrators and IRTs typically must rely on prior monitoring expertise and best practices. Collection of system data, or monitoring, may be performed based on vendor-specified best practices or through the use of monitoring tools and frameworks, and the decision of what to collect is often determined by default parameters. As a result, the data collected may be insufficient for incident and issue analysis, or so voluminous as to make analysis extremely time-consuming and inefficient. Furthermore, when performing incident analysis, IRTs must generally identify features within data that are relevant to the incident, which may not be intuitive, as the root cause of the incident may not be visible in the feature or data source in which errors manifest.

Thus, as will be discussed in greater detail below, the present disclosure may provide a way to understand how data relates to incidents and may be better used to determine which features to collect and on which to focus analysis efforts in incident and issue analysis. In some implementations, the present disclosure may be applied to any distributed computer system in which monitor data about system activity (e.g., numerical metrics and log data) are collected for the purpose of incident detection and analysis of any kind. The types of incidents may include, but are not necessarily limited to, system or network performance, availability, reliability or security. The present disclosure may uniquely prioritize the collection and analysis of monitor data in distributed computer systems (including numerical metrics and semi-structured or unstructured log data) for the example purpose of incident and issue analysis by identifying relationships between features derived from sources of data in the system using, e.g., statistical causal analysis.

As will be appreciated by one skilled in the art, aspects of the present disclosure may be embodied as a system, a method, and/or a computer program product at any possible technical detail level of integration. The computer program product may include a computer readable storage medium (or media) having computer readable program instructions thereon for causing a processor to carry out aspects of the present invention.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Computer program code for carrying out operations for aspects of the present disclosure may be written in any combination of one or more programming languages, including an object oriented programming language such as Java®, Python, Scala, Ruby, and Node.js, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the example implementation of FIG. 1, there is shown prioritization process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a networking device (e.g., firewall, router, gateway, etc.), a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a prioritization process, such as prioritization process 10 of FIG. 1, may identify, by a computing device, data points within a plurality of monitor data corresponding to effects of incidents. The plurality of monitor data may be converted to a set of time series extracted from the plurality of monitor data. The set of time series may be aligned and summarized. A causal relationship graph may be constructed between the set of time series extracted from the plurality of monitor data. Features may be prioritized by likelihood of importance in incident analysis based upon, at least in part, the causal relationship graph.

In some implementations, the instruction sets and subroutines of prioritization process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, prioritization process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a monitoring application (e.g., monitoring application 20), examples of which may include, but are not limited to, e.g., a distributed computer system application in which numerical metrics about system activity and log data (e.g., system or network performance, availability, reliability or security) are collected for the purpose of incident detection and analysis of any kind, or other application that allows for similar data collection, incident detection and/or analysis. In some implementations, prioritization process 10 and/or monitoring application 20 may be accessed via one or more of client applications 22, 24, 26, 28. In some implementations, prioritization process 10 may be a standalone application, or may be an applet/application/script/extension that may interact with and/or be executed within monitoring application 20, a component of monitoring application 20, and/or one or more of client applications 22, 24, 26, 28. In some implementations, monitoring application 20 may be a standalone application, or may be an applet/application/ script/extension that may interact with and/or be executed within prioritization process 10, a component of prioritization process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of prioritization process 10 and/or monitoring application 20. Examples of client applications 22, 24, 26, 28 may include, but are not limited to, e.g., a distributed computer system application in which numerical metrics about system activity and log data (e.g., system or network performance, availability, reliability or security) are collected for the purpose of incident detection and analysis of any kind, or other application that allows for similar data collection, incident detection and/or analysis, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of prioritization process 10 (and vice versa). Accordingly, in some implementations, prioritization process 10 may be a purely server-side application, a purely client-side application, or a hybrid server-side/client-side application that is cooperatively executed by one or more of client applications 22, 24, 26, 28 and/or prioritization process 10.

In some implementations, one or more of client applications 22, 24, 26, 28 may be configured to effectuate some or all of the functionality of monitoring application 20 (and vice versa). Accordingly, in some implementations, monitoring application 20 may be a purely server-side application, a purely client-side application, or a hybrid server-side/ client-side application that is cooperatively executed by one or more of client applications 22, 24, 26, 28 and/or monitoring application 20. As one or more of client applications 22, 24, 26, 28, prioritization process 10, and monitoring application 20, taken singly or in any combination, may effectuate some or all of the same functionality, any description of effectuating such functionality via one or more of client applications 22, 24, 26, 28, prioritization process 10, monitoring application 20, or combination thereof, and any described interaction(s) between one or more of client applications 22, 24, 26, 28, prioritization process 10, monitoring application 20, or combination thereof to effectuate such functionality, should be taken as an example only and not to limit the scope of the disclosure.

In some implementations, one or more of users 46, 48, 50, 52 may access computer 12 and prioritization process 10 (e.g., using one or more of client electronic devices 38, 40, 42, 44) directly through network 14 or through secondary network 18. Further, computer 12 may be connected to network 14 through secondary network 18, as illustrated with phantom link line 54. Prioritization process 10 may include one or more user interfaces, such as browsers and textual or graphical user interfaces, through which users 46, 48, 50, 52 may access prioritization process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
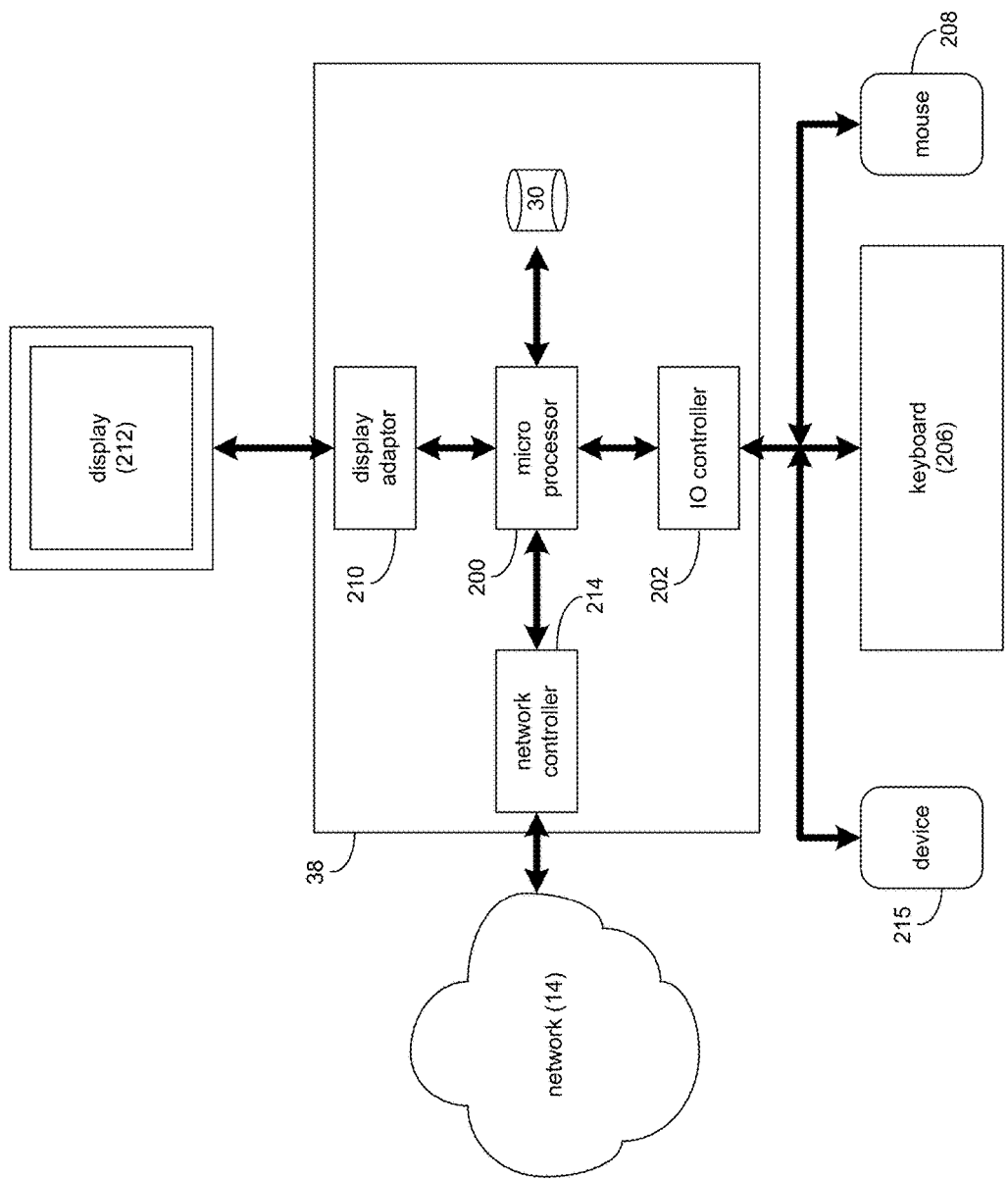
FIG. 2 is an example diagrammatic view of a client electronic device of FIG. 1 according to one or more example implementations of the disclosure.
Figure 3:
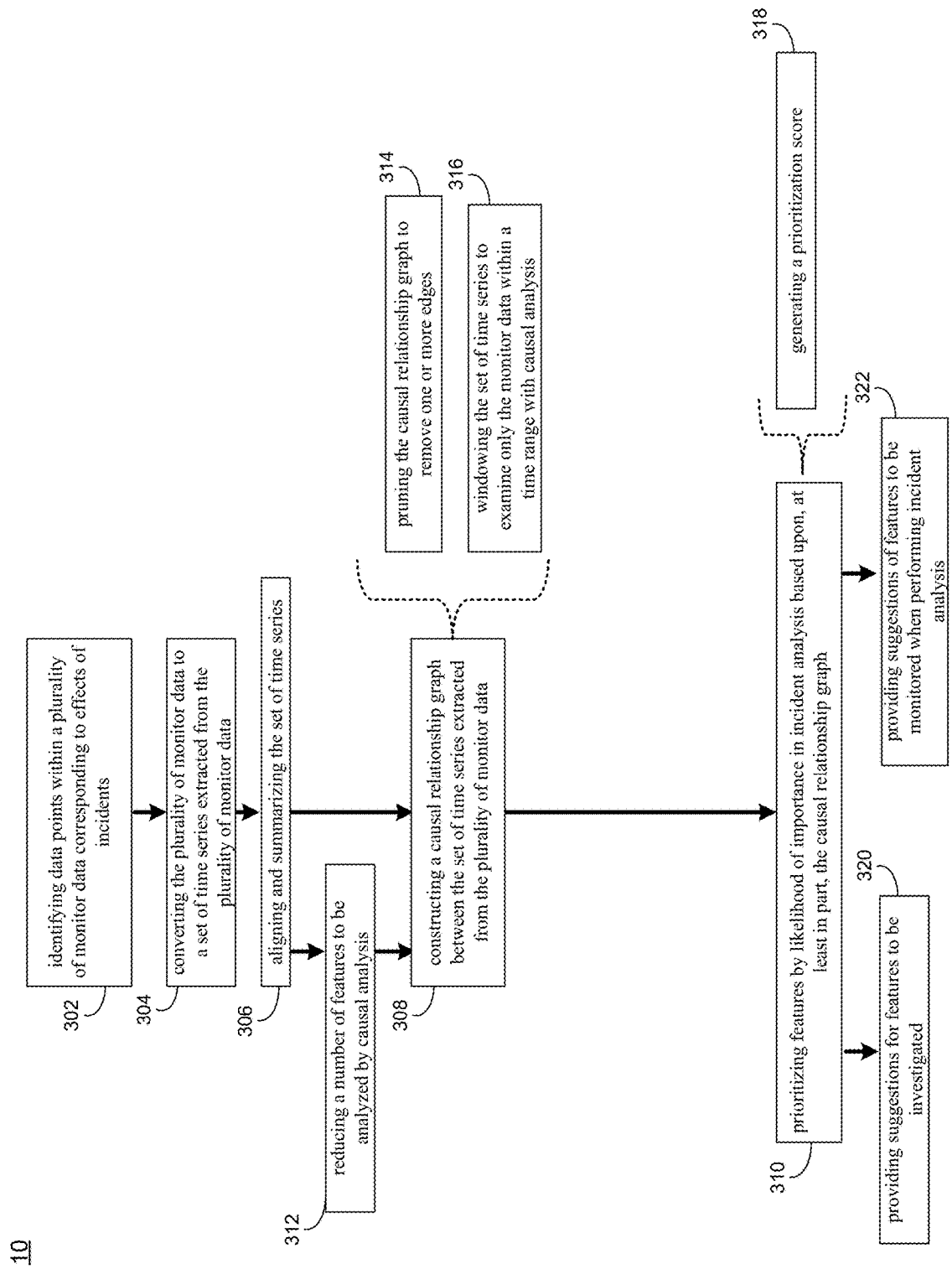
FIG. 3 is an example flowchart of a prioritization process according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, prioritization process 10 may be substituted for client electronic device 38 (in whole or in part) within FIG. 2, examples of which may include but are not limited to computer 12 and/or one or more of client electronic devices 40, 42, 44.

In some implementations, client electronic device 38 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 30). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), custom device (e.g., device 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As will be discussed below, prioritization process 10 may at least help, e.g., improve existing technological processes necessarily rooted in computer network technology associated with, e.g., prioritizing collection and/or analysis of monitor data in a system for the example purpose of incident analysis by identifying relationships between features derived from the data in distributed computer systems. It will be appreciated that the computer processes described throughout are not considered to be well-understood, routine, and conventional functions.

The Prioritization Process:

As discussed above and referring also at least to the example implementations of FIGS. 3-9, prioritization process 10 may identify 302, by a computing device, data points within a plurality of monitor data corresponding to effects of incidents. Prioritization process 10 may convert 304 the plurality of monitor data to a set of time series extracted from the plurality of monitor data. Prioritization process 10 may align and summarize 306 the set of time series. Prioritization process 10 may construct 308 a causal relationship graph between the set of time series extracted from the plurality of monitor data. Prioritization process 10 may prioritize 310 features by likelihood of importance in incident analysis based upon, at least in part, the causal relationship graph.

As will be discussed in greater detail below, prioritization process 10 may have the objective to prioritize which features should be collected and analyzed for the purpose of incident detection and analysis through, e.g., statistical analysis of data collected by monitors in a distributed computing system environment, including, e.g., numerical metrics, and non-numerical data such as categorical data, and textual logs.

As noted above, a distributed computing system may include many diverse components, each with different requirements, objectives, and monitoring capabilities (e.g., via prioritization process 10 and/or monitoring application 20). Generally, monitors may include any sensors that may collect data about the operation of the components in the system, and may include, but are not limited to, those that measure resource utilization, service uptime, and traffic and information flow, and those that collect programmer-defined, semi-structured and unstructured logs generated by the operation of the software and hardware components.

Figure 4:
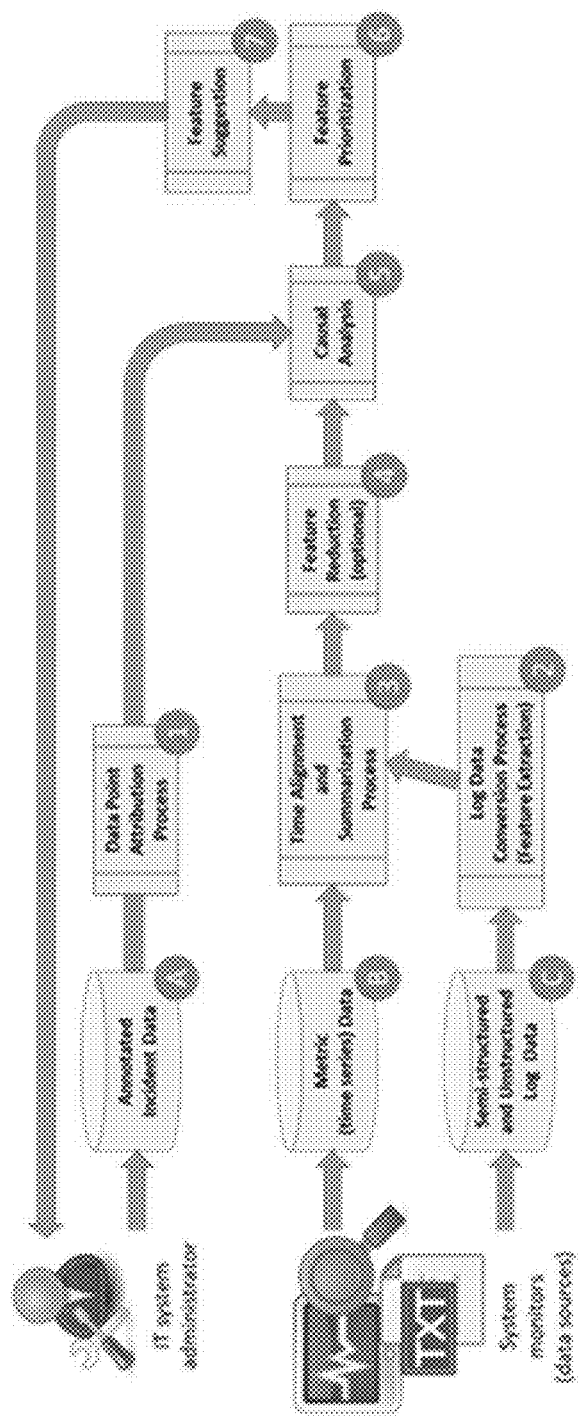
FIG. 4 is an example diagrammatic view of an example data source prioritization system according to one or more example implementations of the disclosure.
Figure 5:
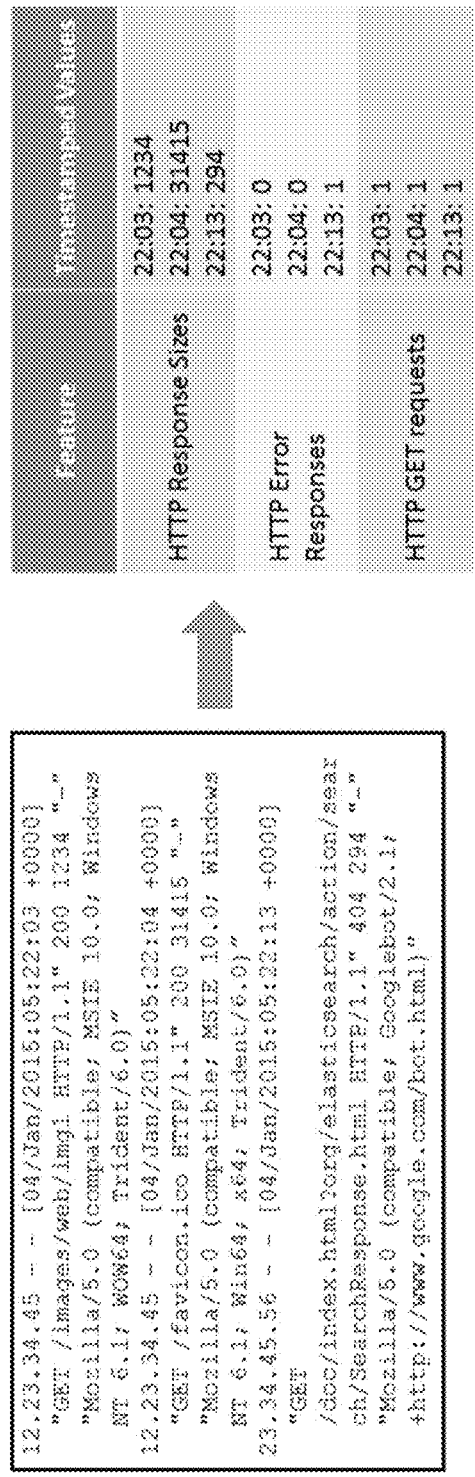
FIG. 5 is an example diagrammatic view of an example data conversion according to one or more example implementations of the disclosure.
Figure 6:
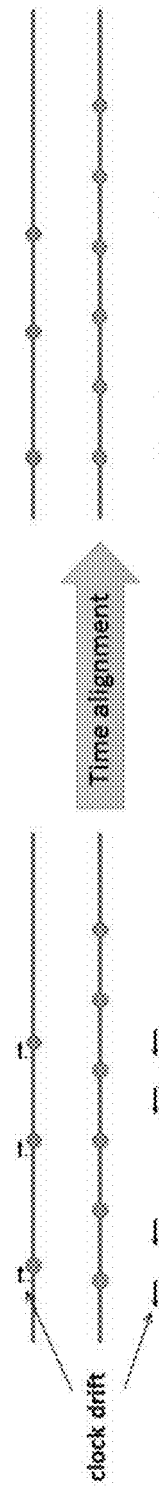
FIG. 6 is an example diagrammatic view of an example time alignment according to one or more example implementations of the disclosure.

In some implementations, and referring at least to the example implementation of FIG. 4, an example data source prioritization system (e.g., data source prioritization system 400) is shown. In the example, each example item and the information processing stages involved during the operational phase of the system are described in more detail below.

In some implementations, prioritization process 10 may consume incident reports provided from a number of possible sources, including, e.g., administrator incident summaries and network traffic analysis, incident analysis software tools and/or middleware devices, to identify the time period in which incidents take place and the features in which the incident's effects manifest. For feature analysis, as part of this step, prioritization process 10 may convert monitor data (e.g., metric and log data) to summarized, time-aligned time series so they can be compared and analyzed with each other (discussed more below).

In some implementations, item A may be any type of data storage discussed throughout, such as the above-noted data store/database, federation of databases, collection of files, or a file that stores present and/or historical incident information with annotations indicating log and/or metric behavior that describes the terminal state of the incident. The incident information here may encompass any information that may be available regarding past and/or present incidents that may have occurred in the system. In the example of distributed computing systems, this may include helpdesk ticket history, human-written reports on prior incidents, alerts that were automatically generated when the incident took place, comments provided by clients or users of the system, etc.

In some implementations, prioritization process 10 may identify, by a computing device, data points within a plurality of monitor data corresponding to effects of incidents. For example, prioritization process 10 may identify 302 and attribute specific data points to individual incidents. In this example, for each incident in Item A, the annotated incident information may be analyzed by prioritization process 10 to determine which entries or features in the data sources correspond to the first points of detection of the incident. This may be done in many example ways. For example, in distributed IT systems, a ticket may be created in the helpdesk when a service level metric is performing poorly or an alert may be generated (via prioritization process 10) from a data source. In this case, the combination of service level metrics that indicate poor performance and the alerts evidencing undesirable behavior may be attributed to the incident. It will be appreciated that attribution of data points to individual incidents may also be done (e.g., via a user interface of prioritization process 10) by a human (e.g., system administrator) or middleware device.

In some implementations, item B may include, e.g., any type of data storage discussed throughout, such as the above-noted data store/database, federation of databases, collection of files, or a file that stores metric data, which may include numerical monitor data sampled at fixed intervals (e.g., via monitoring application 20) in the system. Metric data may be already in a time-series format, so it may be used as-is with time alignment (discussed below). In the example of distributed computing systems, metric data may include, e.g., computer memory utilization, CPU utilization, disk I/O volume, number of processes running, number of web sessions active, number of SQL queries performed, number of databases present, etc.

In some implementations, item C may include any type of data storage discussed throughout, such as the above-noted data store/database, federation of databases, collection of files, or a file that stores semi-structured and unstructured log data, which may be monitor data that may be a composite of numerical and textual fields, may represent a multi-featured time series, and may not have a strict format. In the specific case of distributed computing systems, log data may include authentication log entries, web request log entries, database query log entries, or any other metrics.

In some implementations, prioritization process 10 may convert 304 the plurality of monitor data to a set of time series extracted from the plurality of monitor data. For example, prioritization process 10 may parse and convert monitor data to a set of (potentially sparse) time series before it is further utilized by prioritization process 10. For example, and referring at least to the example implementation of FIG. 5, an example data conversion 500 is shown, where monitor data may be converted 304 from unstructured/semi-structured format to numerical time series (features). There are many ways this may be done, and prioritization process 10 may use any conversion technique. As an example shown in FIG. 5, prioritization process 10 may identify the frequency of different categories of log alerts occurring in consecutive, fixed time windows, and create individual time series for each category.

In some implementations, prioritization process 10 may align and summarize 306 the set of time series. For example, prioritization process 10 may align and summarize the metric and log time series data such that concurrent events and observations take place with very close time stamps, and then prioritization process 10 may aggregate them into coarser grained time windows for future analysis. Time alignment may be done to account for clock drift across different data sources and processing, transmission, or buffering delays in timestamping observations. Aligning the time series may be done in many different ways. For example, and referring at least to the example time alignment 600 implementation of FIG. 6, in a distributed system with small clock drifts and low network latency, prioritization process 10 may timestamp all metric and log entries with a centralized network timestamp. As another example, prioritization process 10 (and/or monitoring application 20) may collect snapshots of clock time from all monitors over the course of data collection, and prioritization process 10 may adjust all metric and log entries according to the collected clock times.

Figure 7:
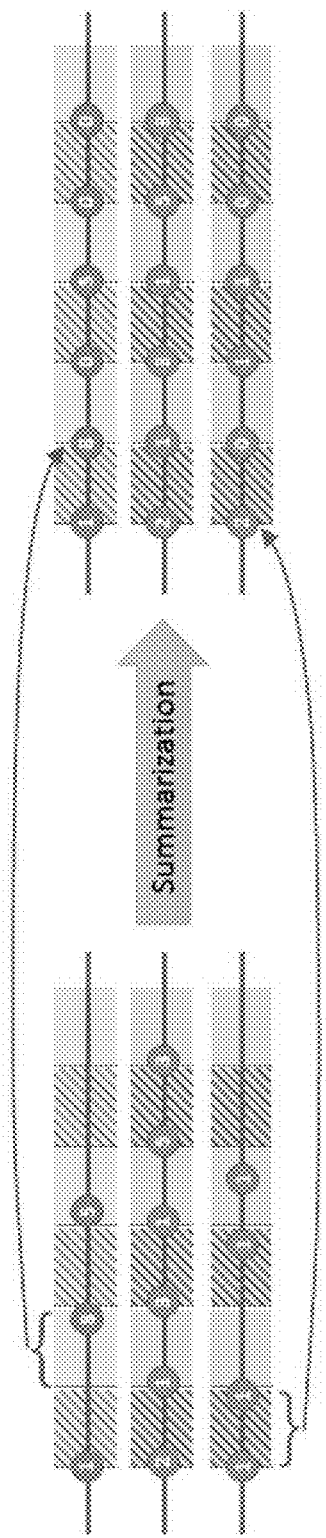
FIG. 7 is an example diagrammatic view of an example summarization according to one or more example implementations of the disclosure.
Figure 8:
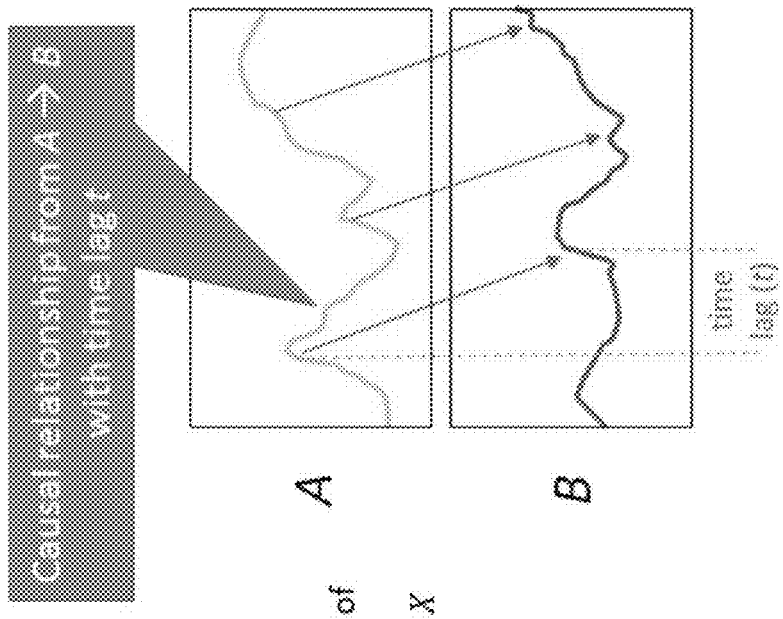
FIG. 8 is an example diagrammatic view of an example causal relationship between two example features according to one or more example implementations of the disclosure.

Furthermore, and referring at least to the example summarization 700 implementation of FIG. 7, once the time series are aligned, prioritization process 10 may divide the time series into consecutive, fixed time windows, and aggregate the values of each time series within each time window to create a summarized time series. Summarization may be done to reduce the complexity of analysis of the data over long time scales. The size of the time window may be a tunable parameter that may be adjusted (via prioritization process 10) based on administrator knowledge of incident timescales, and the aggregation method may be any operation on a set of numbers. Common aggregation operations may include, e.g., summing all values, taking the average of all values, or taking the count of all values. The output of this process may be a new set of time-aligned, summarized time series with a uniform time scale and time range across all. The output set of time series may correspond in a one-to-one mapping to the time series derived from Items B and C.

In some implementations, prioritization process 10 may use statistical causal analysis to identify possible causal relationships between features in the data for each incident. To do this, prioritization process 10 may perform causal analysis between the feature in which the incident manifested and all other features across all data sources collected to determine if any of the features show temporal causal relationships. Prioritization process 10 may start at the point at which the incident manifests in the data, and repeat the causal analysis proceeding backwards in time in each iteration. For the pairs of features that have a sufficiently strong correlation, prioritization process 10 may create edges in a causal relationship graph of the features annotated by strength of correlation and time lag.

In some implementations, and preceding the causal analysis, a number of features to be analyzed by causal analysis may be reduced 312 by prioritization process 10. For example, as an optional step, prioritization process 10 may reduce 312 the number of features that must be analyzed by causal analysis to improve the scalability of analysis and improve interpretability of the results. Feature reduction may be done in many different ways. As an example, prioritization process 10 may compute the Pearson correlation coefficient for all pairs of features, then find subsets of features within which all features are highly correlated with each other and remove all but one of the features in each subset. It will be appreciated that this example is very specific and was provided for example purposes only. It will be appreciated that feature reduction is a general term used to refer to any method for identifying a subset or transformation of the original feature space upon which further analysis may be more scalable or more effective. It may also be referred to as, e.g., feature extraction, feature selection, or dimensionality reduction.

In some implementations, prioritization process 10 may construct 308 a causal relationship graph (e.g., for each incident) between the set of time series extracted from the plurality of monitor data. For example, and referring at least to the example implementation of FIG. 8, an example causal relationship graph (e.g., causal relationship graph 800) is shown. In the example, prioritization process 10 may analyze the time series data and attributed incident data using statistical causal analysis to construct causal relationship graph 800. The goal may be to identify features that statistically correlate with the terminal feature (discussed below) subject to time lag. In some implementations, each node of the causal relationship graph may represent a time series, and each edge may represent a statistical causal relationship with time lag and causation probability specified by edge weight.

Constructing 308 the causal relationship graph for an incident may include identifying the time periods in which the incident takes place and associated features in which the effects of the incident manifest. Prioritization process 10 may hereafter refer to the feature(s) and associated time period(s) as the terminal feature(s). For instance, for each set of attributed data points, prioritization process 10 may identify the corresponding timestamps in the summarized time series, $T=\{T_1, T_2, T_3, \ldots\}$, in which the data points reside.

In some implementations, constructing 308 the causal relationship graph may optionally include windowing 316 the time series to examine only the data points within a time range $[T-t_w, T]$ with causal analysis, where the window size, $t_w$, may be chosen by an administrator based on an understanding of incident timescales or by an algorithm.

In some implementations, constructing 308 the causal relationship graph may include identifying causal relationships between subsets of features, potentially subject to time lags. For example, and referring at least to the construction of the example causal relationship graph 900 in FIG. 9, letting E be a terminal feature, prioritization process 10 may compute for each pair of features (A, E), for some time lag l in a set of possible time lags, the probability $P_{A \to E, l}$ that feature A statistically causes feature E subject to time lag l. The mathematical mechanism for the causal relationship may be one of many, including, e.g., linear or nonlinear regression analysis, Granger causality analysis, Bayesian analysis, etc. As an example, prioritization process 10 may use Granger causality, which uses linear autoregression, as the basis of the causal analysis.

Figure 9:
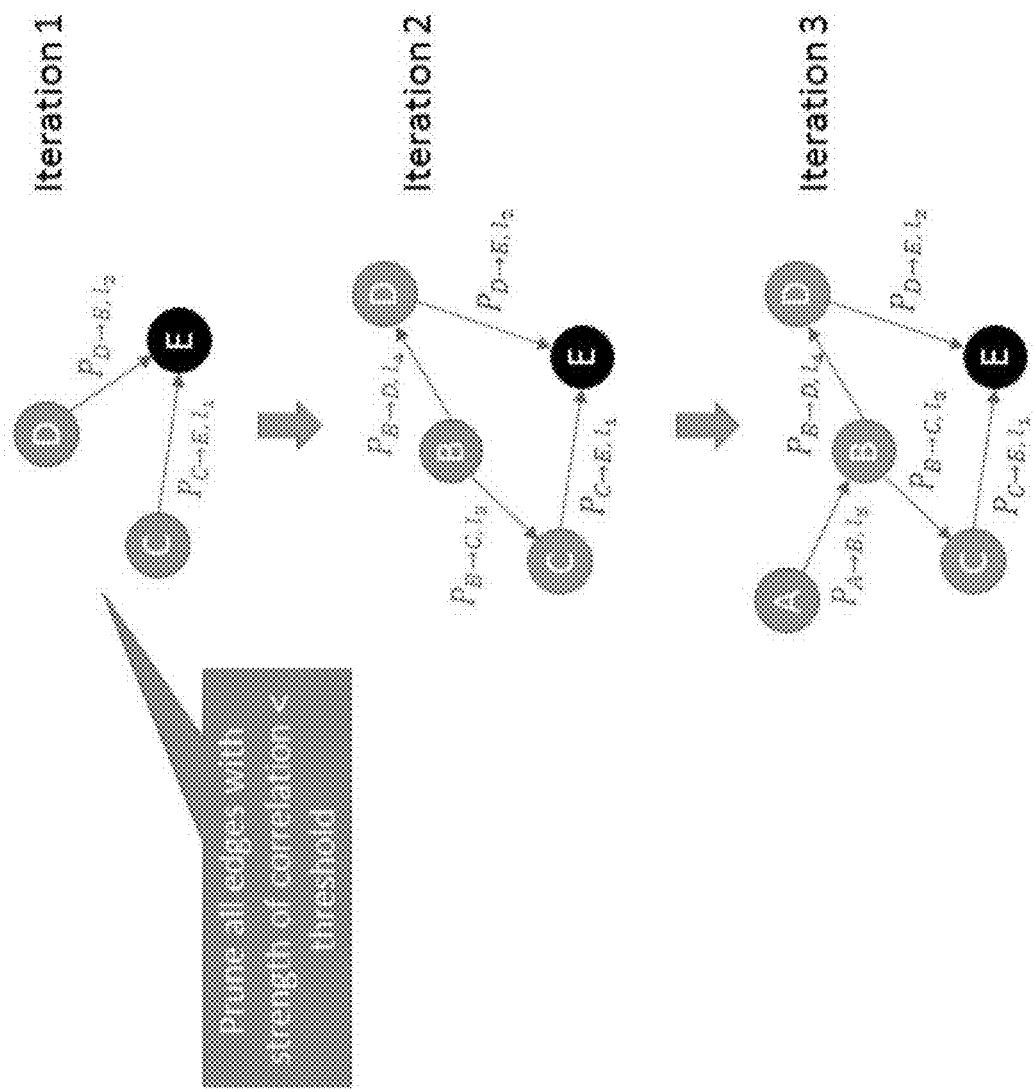
FIG. 9 is an example diagrammatic view of an example causal relationship graph according to one or more example implementations of the disclosure.

In some implementations, constructing 308 the causal relationship graph may optionally include, in some implementations, pruning 314 of the causal relationship graph to remove edges. For example, prioritization process 10 may remove edges that do not meet a tunable minimum causation threshold or those that are superfluous because they represent a causal relationship already captured by a combination of a subset of the other edges in the graph. Prioritization process 10 may repeat the above for a predetermined number of iterations for each new node in the causal relationship graph for each terminal feature, replacing the terminal feature with the new node and re-windowing the features at each iteration. For example, and referring at least to the example implementation of FIG. 9, an example causal relationship graph 900 is shown (with three iterations) which is yielded for terminal feature E by the above. FIG. 9 shows the example causal relationship graph for features {A, B, C, D, E} and terminal feature E (shown at iteration 3). It will be appreciated that the graph may be optionally extended by stepping backwards in time.

To efficiently compute the causal relationships, prioritization process 10 may make multiple enhancements. For example, one such enhancement may include using the Lasso method to reduce the number of pairwise comparisons made. Furthermore, algorithms such as the PC algorithm and its many extensions and variants, may be used to efficiently compute the causal relationships across a large number of features.

In some implementations, prioritization process 10 may prioritize 310 features by likelihood of importance in incident analysis based upon, at least in part, the causal relationship graph. For instance, prioritization process 10 may examine the causal relationship graph to determine which data has more of a likelihood of being important in incident analysis, and may provide an ordering of the features based on the importance. As an example, and referring at least to the example causal relationship graph 900 in FIG. 9, each node in the causal relationship graph may have a time lag and a strength of correlation with its successor node. As the strength of correlation grows weaker through successive steps back from the attributed data points, the likelihood of the observation being directly related to the incident may be believed to decrease.

In some implementations, prioritizing 310 features may include generating 318 a prioritization score. For example, for each incident and feature pair, prioritization process 10 may compute a prioritization score (PS), where the prioritization score may be a function of the extended causal graph that relates features to the strength of evidence they provide for the incident. As an example, PS may be computed as follows, where l>0, because any (duplicate) features with high correlation and no time lag may be removed through feature reduction:

$$PS(\text{feature } X) = \sum_{\substack{\text{all paths P from X to the} \\ \text{terminal feature}}} \left( \prod_{\substack{\text{all consecutive nodes} \\ A,B \text{ on path } P}} \frac{P_{A \to B, l}}{l} \right)$$

In some implementations, suggestions for features to be monitored may be provided 320 by prioritization process 10. For example, prioritization process 10 may propose new monitoring guidelines based on the set of incidents that a system administrator (or other user) may deem important to be detected in future system operation and the prioritization of features obtained from the above. That is, prioritization process 10 may use the above-noted prioritization scores and causal relationship graph to suggest 320 features to collect to a system administrator (or other user). Once the prioritization of features has been completed, the administrator (via prioritization process 10) may examine the ranking of the features to make decisions on what to monitor (e.g., use the rankings of features to understand how to change system monitoring to collect data that are useful for detecting incidents but are not being collected, or to stop collecting data that are of very low priority that are being collected).

For example, an administrator could choose to collect data for only the top k features for each of the incidents observed in the system, or collect data for all features X with PS(X) greater than some threshold.

In some implementations, prioritization process 10 may use the above-noted prioritization scores and causal relationship graph to suggest 322 features to be investigated when performing incident analysis. As an example, an incident response team, in response to a helpdesk ticket, may use the prioritization scores from prioritization process 10 to analyze features within system monitor data in decreasing order of likely correlation to the incident captured by the ticket, which may reduce the amount of time and energy spent analyzing the ticket and lead to quicker resolution. The system administrator (via prioritization process 10) may also use the prioritization as an ordered set of features to investigate when a given incident is believed to be taking place or to have taken place, thus decreasing the time to detection for the incident through manual analysis. The above (e.g., from FIG. 3) may be repeated when new incident data is available, or before a system is provisioned with monitors based on the incident detection requirements provided by system administrators.

The example and non-limiting advantages of the present disclosure may include, e.g., generality with respect to the types of data that may be consumed and analyzed, including any type of data that may be converted into a time series; generality with respect to the types of incidents for which the analysis is done; and enhanced guidance provided to system administrators regarding which data to collect and how to prioritize analysis of data when an incident occurs.

It will be appreciated that while the present disclosure describes the use of distributed computer (IT) systems, it will be appreciated that other types of computer systems may be used without departing from the scope of the present disclosure. As such, the use of a distributed computer system should be taken as example only and not to otherwise limit the scope of the disclosure. Additionally, it will be appreciated that other example implementations may be used for networked devices (e.g., routers, firewalls, gateways, or server directing clients over a network), where one or more of the devices (via prioritization process 10) may direct the other devices to collect data and perform the steps of the present disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   identifying, by a computing device, data points within a plurality of monitor data corresponding to effects of incidents;
   converting the plurality of monitor data to a set of time series extracted from the plurality of monitor data;
   time aligning and summarizing the set of time series, wherein time aligning the set of time series comprises collecting a plurality of clock time snapshots from a plurality of monitors and adjusting the set of time series based on the collected plurality of clock time snapshots;
   constructing a causal relationship graph between the set of time series extracted from the plurality of monitor data, wherein the causal relationship graph includes a plurality of edges, wherein the plurality of edges are annotated by a strength of correlation value and a time lag value, and wherein constructing the causal relationship graph includes pruning the causal relationship graph to remove one or more edges that are determined to be redundant based on edges that have a zero time lag value; and
   prioritizing features by likelihood of importance in incident analysis based upon, at least in part, the causal relationship graph.

2. The computer-implemented method of claim 1 further comprising windowing the set of time series to examine only the monitor data within a time range with causal analysis.

3. The computer-implemented method of claim 1 further comprising reducing a number of features to be analyzed by causal analysis.

4. The computer-implemented method of claim 1 wherein prioritizing features includes generating a prioritization score.

5. The computer-implemented method of claim 1 further comprising providing suggestions for features to be investigated.

6. The computer-implemented method of claim 1 further comprising providing suggestions for features to be monitored when performing incident analysis.

7. A computer program product residing on a computer readable storage medium having a plurality of instructions stored thereon which, when executed across one or more processors, causes at least a portion of the one or more processors to perform operations comprising:
   identifying data points within a plurality of monitor data corresponding to effects of incidents;

converting the plurality of monitor data to a set of time series extracted from the plurality of monitor data;

time aligning and summarizing the set of time series, wherein time aligning the set of time series comprises collecting a plurality of clock time snapshots from a plurality of monitors and adjusting the set of time series based on the collected plurality of clock time snapshots;

constructing a causal relationship graph between the set of time series extracted from the plurality of monitor data, wherein the causal relationship graph includes a plurality of edges, wherein the plurality of edges are annotated by a strength of correlation value and a time lag value, and wherein constructing the causal relationship graph includes pruning the causal relationship graph to remove one or more edges that are determined to be redundant based on edges that have a zero time lag value; and prioritizing features by likelihood of importance in incident analysis based upon, at least in part, the causal relationship graph.

8. The computer program product of claim 7 wherein the operations further comprise windowing the set of time series to examine only the monitor data within a time range with causal analysis.

9. The computer program product of claim 7 wherein the operations further comprise reducing a number of features to be analyzed by causal analysis.

10. The computer program product of claim 7 wherein prioritizing features includes generating a prioritization score.

11. The computer program product of claim 7 wherein the operations further comprise providing suggestions for features to be investigated.

12. The computer program product of claim 7 wherein the operations further comprise providing suggestions for features to be monitored when performing incident analysis.

13. A computing system including one or more processors and one or more memories configured to perform operations comprising:

identifying data points within a plurality of monitor data corresponding to effects of incidents;

converting the plurality of monitor data to a set of time series extracted from the plurality of monitor data;

time aligning and summarizing the set of time series, wherein time aligning the set of time series comprises collecting a plurality of clock time snapshots from a plurality of monitors and adjusting the set of time series based on the collected plurality of clock time snapshots;

constructing a causal relationship graph between the set of time series extracted from the plurality of monitor data, wherein the causal relationship graph includes a plurality of edges, wherein the plurality of edges are annotated by a strength of correlation value and a time lag value, and wherein constructing the causal relationship graph includes pruning the causal relationship graph to remove one or more edges that are determined to be redundant based on edges that have a zero time lag value; and prioritizing features by likelihood of importance in incident analysis based upon, at least in part, the causal relationship graph.

14. The computing system of claim 13 wherein the operations further comprise windowing the set of time series to examine only the monitor data within a time range with causal analysis.

15. The computing system of claim 13 wherein the operations further comprise reducing a number of features to be analyzed by causal analysis.

16. The computing system of claim 13 wherein prioritizing features includes generating a prioritization score.

17. The computing system of claim 13 wherein the operations further comprise providing suggestions for at least one of features to be investigated and features to be monitored when performing incident analysis.

* * * * *